No. 873,681.   
PATENTED DEC. 10, 1907.
J. H. PENDLETON.
POWER TRANSMISSION MECHANISM.
APPLICATION FILED APR. 25, 1906.
2 SHEETS—SHEET 1.
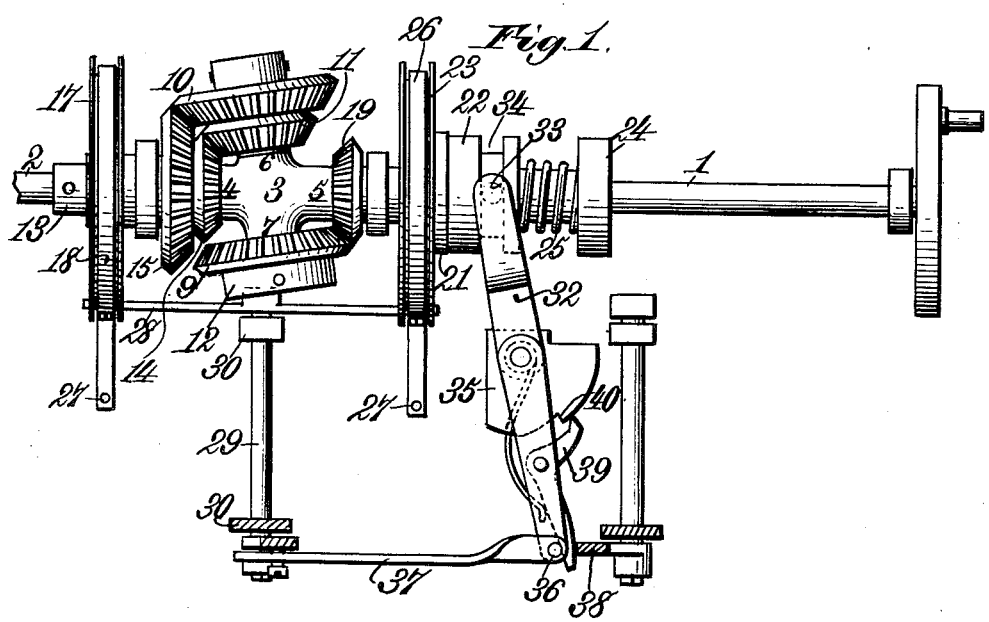
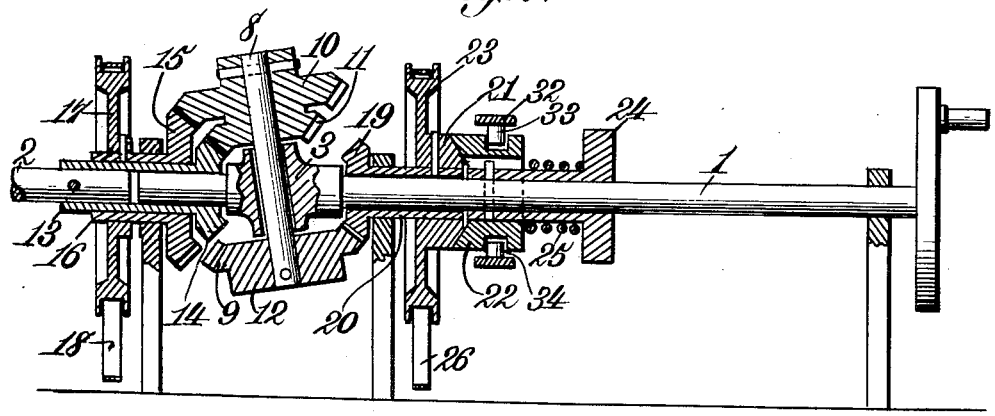
Witnesses:
Robert Everett,
Inventor.
John Hyde Pendleton,
By James L. Norris,
Att'y.

No. 873,681. PATENTED DEC. 10, 1907.
J. H. PENDLETON.
POWER TRANSMISSION MECHANISM.
APPLICATION FILED APR. 25, 1906.
2 SHEETS—SHEET 2.
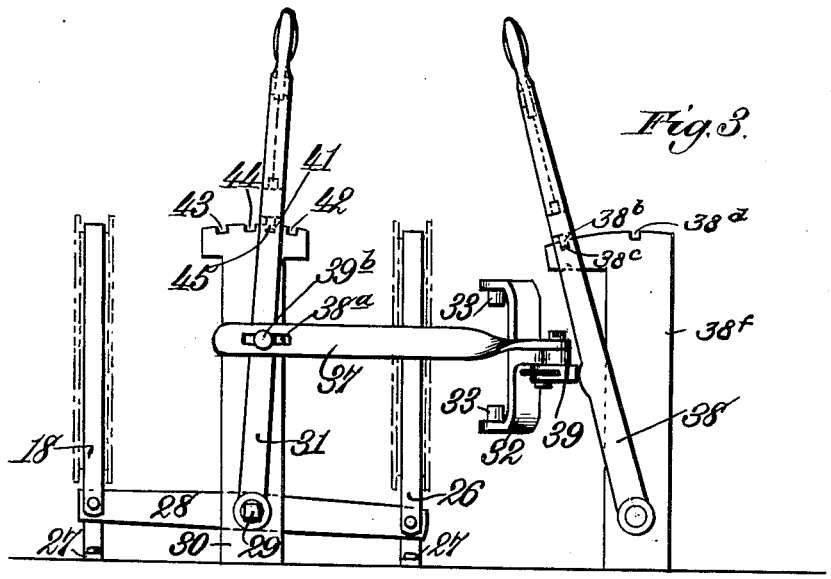
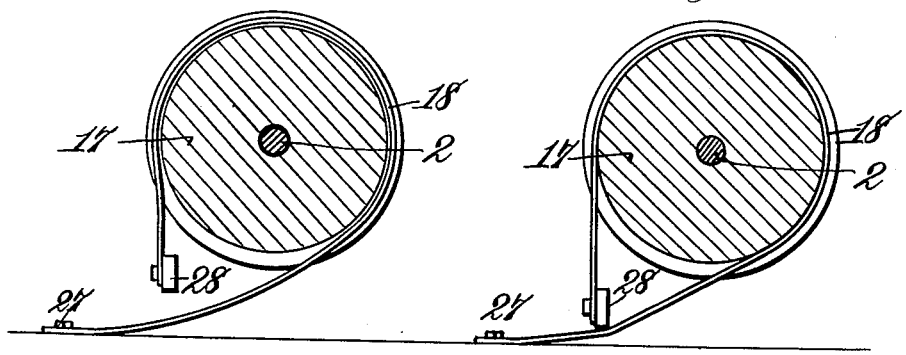
Witnesses
Robert Everett
T. B. Keefer
Inventor
John Hyde Pendleton
By James L. Norris
Atty.

UNITED STATES PATENT OFFICE.

JOHN HYDE PENDLETON, OF WEST PHILADELPHIA, PENNSYLVANIA, ASSIGNOR OF ONE-HALF TO EDWARD A. HENKLE, OF PHILADELPHIA, PENNSYLVANIA.

POWER-TRANSMISSION MECHANISM.

No. 873,681.   Specification of Letters Patent.   Patented Dec. 10, 1907.

Application filed April 25, 1906. Serial No. 313,630.

*To all whom it may concern:*

Be it known that I, JOHN HYDE PENDLETON, a citizen of the United States, residing at West Philadelphia, in the county of Philadelphia and State of Pennsylvania, have invented new and useful Improvements in Power-Transmission Mechanism, of which the following is a specification.

This invention relates to a motion transmission mechanism adapted for use in connection with motor vehicles, or for any purposes where it is found applicable; and aims to provide a mechanism of such character in a manner as hereinafter set forth whereby the driven part may be caused to move in the same direction as the driving element at full speed or less than full speed, or in a direction opposite to the direction of movement of the driving element, or brought to an idle position while the driving element is in full operation.

The invention further aims to provide a motion transmission mechanism for the purpose set forth which shall be simple in its construction, strong, durable, efficient in its use, readily operated and comparatively inexpensive to set up.

With the foregoing and other objects in view, the invention consists of the novel construction, combination and arrangement of parts hereinafter more specifically described and illustrated in the accompanying drawings and in which is shown, by way of example, a motion transmission mechanism in accordance with this invention; but it is to be understood that changes, variations and modifications can be resorted to which come within the scope of the claims hereunto appended.

In the drawings, wherein like reference characters denote corresponding parts throughout the several views: Figure 1 is a top plan view of a motion transmission mechanism in accordance with this invention; Fig. 2 is a longitudinal section; Fig. 3 is a front view of the shifting levers, and Figs. 4 and 5 illustrate, respectively, one of the band clutches in inoperative and operative position.

Referring to the drawings by reference characters, in which is shown, by way of example, a combination of elements setting up a motion transmission mechanism in accordance with this invention, the reference character 1 denotes the driving element, as shown; a driving shaft which is adapted to be suitably connected with a prime mover (not shown) and 2 denotes the driven element as shown; a driven shaft which is to be connected in any suitable manner with the axle of the vehicle (not shown) or to the part or mechanism or machine which is to be driven by said driven shaft 2.

The driving shaft 1 is formed of two sections, one of which is termed the primary section and the other of which the auxiliary section; and interposed between and fixedly secured to the said sections is a hollow revoluble coupling member 3 having four arms 4, 5, 6, and 7, the arms 4, 5 being in longitudinal alinement with each other and are connected respectively to the opposing ends of the primary and auxiliary sections of the driving shaft 1. The arms 6, 7 extend in a diagonal manner with respect to the direction in which the driving shaft 1 extends, and the said arms 6, 7 are adapted to rotatably support a shaft 8 which projects from each of the arms 6, 7, extends in the same direction as the arms 6, 7 and carries on one end a beveled gear 9 and on its other end a beveled gear 10 of the same diameter as the gear 9. On that end of the shaft 8 which carries the beveled gear 10 and in advance of said gear 10 is fixed a beveled pinion 11, and on that end of the shaft 8 which carries the beveled gear 9, a counterbalanced weight 12 is fixed.

Fixed to the inner end of the driven shaft 2 is the hub 13 of a beveled pinion 14 which projects away from the inner end of the driven shaft 2 and is provided with a centrally-arranged opening into which extends the auxiliary section of the driving shaft 1. The beveled pinion 14 is somewhat smaller than the pinion 11, and in the example of the invention as shown, the beveled pinion 14 is provided with two less teeth than the pinion 11, and the said pinion 11 meshes with the pinion 14.

Loosely mounted upon the hub 13 and the pinion 14 is the hub 16 of a beveled gear 15 which is arranged at the back of the beveled pinion 14, and said gear 15 is of the same diameter as each of the gears 9 and 10 and is adapted to mesh with the gear 10, but never is in engagement with the gear 9. The hub 16 of the gear 15 is fixed to one member 17 of a brake which, by way of example, is shown as a grooved wheel, and engaging in the groove of the member 17 is the other member of the brake and which consists of a band 18; the function of the band 18 is to retain the member 17 and gear 15 stationary when occasion so requires.

Loosely mounted upon the primary section of the driving shaft 1 is a beveled pinion 19 having an elongated hub 20. Said beveled pinion 19 is in mesh with the gear 9. Owing to the manner in which the shaft 8 extends, that is to say, obliquely with respect to the direction in which the driving shaft extends, it will be evident that the gear 9 is caused to mesh with the pinion 19, the pinion 11 to mesh with the pinion 14, and the gear 10 to mesh with the gear 15.

To lock the gears and pinions referred to so that the driven shaft will rotate in the same direction as the driving shaft, so what may be termed direct or forward speed can be had, means is provided to clutch the pinion 19 to the driving shaft; and said means consists, by way of example, of a cone-shaped element 21 forming the stationary member of a clutch, and which associates with a slidable sleeve 22 having its inner face coned for frictionally gripping the element 21. The latter is carried by a grooved wheel 23 fixed to the hub 20 of the pinion 19. The sleeve 22 is feathered upon the shaft 1 so that it can be longitudinally adjusted but will rotate with the shaft. Surrounding the shaft 1 and interposed between a collar 24 and the sleeve 22 is a compression spring 25, the function thereof being to automatically assist in the return of the sleeve 22 to clutching position with respect to the element 21. Now, therefore, it will be evident that if the sleeve 22 is in clutching position with the element 21 the pinion 19 will be locked to the shaft 1 so that when the shaft 1 is rotated, no relative motion will be imparted to the gears and pinions as they will be locked together, and consequently the driven shaft 2 will be caused to rotate. The wheel 23 also constitutes one member of a brake, and the other member of the brake is indicated by the reference character 26 and consists of a band positioned in the groove of the wheel 23. The function of the brake formed of the wheel 23 and the band 26 is to hold, when occasion requires, the beveled pinion 19 so as to cause the gear 9 to roll over the face of said pinion 19, rotate the shaft 8 and impart motion to the shaft 2 through the medium of the pinions 11 and 14, but said motion being in the same direction as the direction of movement of and at less speed than the driving shaft.

The bands 18 and 26 have one end fixed, as at 27, and the other end connected to a lever-arm 28 fixed to one end of a rock-shaft 29, the latter being journaled in a bearing bracket 30 and connected to a shifting lever 31. The sleeve 22 is shifted through the medium of a yoke-shaped lever-arm 32 which has one end straddling the sleeve 22 and provided with lugs 33 traveling in a groove 34 formed on the periphery of the sleeve 22, and the said arm 32 is pivotally supported by the bracket 35 and has its outer end pivotally connected, as at 36, to a link 37 which, through the medium of the slot and pin $38^a$, $39^b$, respectively, is attached to the shifting lever 31.

From the foregoing construction, it is evident that when the lever 31 is shifted in one direction, it will rock the shaft 29 and also the arm 28, and cause the band 18 to engage the member 17 and fix it from movement; consequently holding the gear 15 stationary. When the lever 31 is moved in the direction stated, it will carry the link 37 therewith, shifting the lever-arm 32 upon its pivot, and the latter will separate the sleeve 22 from the element 21, consequently releasing the pinion 19 so that it can revolve loosely upon the shaft 1. If the lever is moved in the opposite direction, that is to say, towards the wheel 23, the pin-and-slot connection between the link 37 and lever 31 will permit movement of the lever independent of the link, but said lever 31 will rock the shaft 29 in an opposite direction, imparting a like movement to the arm 28 and cause the band 27 to engage the wheel 23, consequently fixing the pinion 19 fast, so that it will not rotate with the shaft 1.

A shifting arm 38 is provided for moving the lever-arm 32 so as to shift the sleeve 22 out of engagement with the element 21, and said lever arm 32 when shifted is retained in its shifted position by means of a dog 39 engaging a notch 40 formed on the bracket 35. By such an arrangement, the sleeve 22 is held out of engagement with the element 21, and this operation is performed when the shifting lever 31 is moved to cause the bandbrake 26 to engage the wheel 23 so as to retain the pinion 19 from movement.

A pawl and lever $38^b$ is provided for engagement with the notches $38^c$ and $38^d$ formed in the upright $38^f$. When the pawl engages in the notch $38^d$ the shifting arm 38 is retained in its inoperative position, but when the pawl engages in the notch $38^c$ the shifting arm 38 is retained in its operative position, the operative position of the shifting arm 38 being such as to retain the element 22 out of clutching engagement with the element 21.

The bracket 30 is provided with four notches to receive a spring-holding dog 45 carried by the lever 31 so that when the dog 45 engages any one of the notches it will hold the lever. One of the notches is indicated by the reference character 41 and it is used for direct drive—that is to say, if the dog engages in the notch 41 and the arm 38 moved to inoperative position direct drive will be secured. Another of the notches is indicated by the reference character 42.

This notch is adapted to receive the dog 45 for retaining the lever in position to attain reduced speed while going ahead. The shifting arm 38 is also moved to have the dog 38$^b$ engage in the notch 38$^c$ to obtain reduced speed while going ahead when the lever 31 has its dog 45 engaged in the notch 42. Another of the notches is indicated by the reference character 43 and which is utilized to receive the dog 45 to retain the lever in position so as to attain reverse movement and the remaining notch is indicated by the reference character 44 and which receives the dog 45 so as to hold the lever 31 in neutral position, thereby obtaining a stoppage of the vehicle.

When the lever 31 is moved so as to have the dog 45 engage in the notch 43 the gear 15 will be held fast and the members 21 and 22 unclutched as well as the band 26 released from the wheel 23, and the pinion 19 will be loose upon the shaft 1. When the parts are arranged in such position the driven shaft will rotate in the direction opposite to the direction in which the driving shaft is rotated, or in other words this movement may be termed a reversal of the movement of the driven shaft so that when the mechanism is used in connection with a motor vehicle the latter will be caused to back. If the lever 31 is shifted so the dog 45 will engage in the notch 42 and the arm 38 shifted so as to move the member 22 out of engagement with the member 21, the pinion 19 will be fixed and the gear 9 will roll over the face of the pinion 19 and impart motion to the shaft 8. Such position of the parts will cause the driven shaft to rotate in the same direction as the driving shaft, but with less speed, consequently obtaining what may be termed, low direct speed.

When the lever 31 is shifted to have the dog 45 thereof engage in the notch 41 and the arm 38 is shifted to notch 38$^d$ the members 21, 22 will be in clutching engagement and the brake 23 will be off, consequently the parts will all be locked together and the driven shaft 2 will be rotated in the same direction as the driving shaft and at the same rate of speed, consequently obtaining what may be termed direct drive, and when the lever 31 is shifted to have the dog 45 engage in the notch 44 the position of the parts will be neutral—that is to say, the clutching members 21 and 22 will be out of engagement, the brakes formed by the elements 18 and 26, and 17 and 23 will be in inoperative position and therefore no motion will be transmitted from the driving shaft to the driven shaft, although the driving shaft is rotating at full speed.

In order to get low speed from a position of reverse when the arm 38 is in its inoperative position, the lever 31 is moved to the notch 42, which will cause the dog 39 on the lever 32 to automatically engage the notch 40 and hold the clutch out of engagement. To obtain high speed, the lever 31 is moved to the notch 41 and the arm 38 shifted to throw the dog 39 out of engagement with the notch 40 and the arm 38 is then moved back to inoperative position, thereby allowing the clutch to be moved to operative position.

It is evident that in view of the foregoing description, taken in connection with the accompanying drawings, a power transmission mechanism is set up which is of simple and compact construction, wherein three speed changes can be secured in a convenient manner without sudden shock to the several co-operating gear devices, and in which the action of varying the speed shall be both positive and effective, and without disconnecting the driving shaft from the engine, or in any manner interfering with the speed of the driving shaft, the speed of the driving shaft being the same through all the changes, whether the direction of the movement of the driven shaft is the same as the driving shaft or in a reverse direction, or whether the speed of the driven shaft is less than the speed of the driving shaft. Furthermore, owing to the fact that the gears and pinions are always in mesh, there is no danger of the teeth of the gears and pinions becoming mutilated as would be the case if the gears and pinions were moved away and returned to mesh with each other.

Having thus fully described my invention, what I claim as new and desire to secure by Letters Patent, is:

1. A power transmission mechanism comprising the combination with a driving element and a driven element, of a pinion clutched to the driving element, a pinion fixed to the driven element, a gear loosely mounted upon said last-mentioned pinion, a rotatable shaft extending in an oblique direction with respect to said driving element and carried thereby, a gear fixed on one end of said obliquely-extending shaft and permanently meshing with the pinion clutched to the driving element, a gear and pinion fixed on the other end to said obliquely-extending shaft and permanently meshing, respectively, with the gear mounted loosely upon said fixed pinion and said fixed pinion, and means for unclutching said pinion from the driving element and for holding said loose gear stationary, causing thereby the rotation of the driven element in a direction opposite to the direction of movement of and at less speed than the speed of the driving element.

2. A power transmission mechanism comprising the combination with a driving element and a driven element, of a pinion loosely mounted upon the driving element, a pinion fixed to the driven element, a rotatable shaft extending in an oblique direction with respect to said driving element, a gear on one end of said obliquely-extending shaft permanently meshing with the pinion loosely mounted upon the driving element, a pinion on the other end of said obliquely-extending shaft and permanently meshing with said fixed pinion, and means for clutching said loose pinion to the driving element causing thereby the rotation of the driven element in the same direction and at the same rate of speed as the driving element.

3. A power transmission mechanism comprising the combination with a driving element and a driven element, of a pinion loosely mounted on the driving element, means for clutching said pinion to the driving element, means for unclutching said pinion and for holding said pinion fast, a revoluble coupling carried by and moving with said driving element, a rotatable shaft extending obliquely through said coupling, a gear on said shaft permanently meshing with said pinion, a pinion on said shaft, another gear on said shaft, a pinion fixed to the driven element and permanently meshing with the pinion on said shaft, a gear loosely mounted on the pinion fixed to the driven element and permanently meshing with the gear on said shaft, and means for holding said loose gear stationary.

In testimony whereof I have hereunto set my hand in presence of two subscribing witnesses.

JOHN HYDE PENDLETON.

Witnesses:
CARL HERING,
E. A. HENKLE.